United States Patent
Gidron et al.

(10) Patent No.: US 8,818,338 B2
(45) Date of Patent: Aug. 26, 2014

(54) SERVICE PLATFORM FOR CELLULAR TELEPHONY

(75) Inventors: Yoad Gidron, Yokneam Illit (IL); Shai Kapon, Zichron Yaakov (IL); Yaron Gur-Ari, Qiryat Bialik (IL); Benny Reich, Haifa (IL)

(73) Assignee: Alcatel Lucent, Boulogne-Billancourt (FR)

( * ) Notice: Subject to any disclaimer, the term of this patent is extended or adjusted under 35 U.S.C. 154(b) by 669 days.

(21) Appl. No.: 10/573,832

(22) PCT Filed: Oct. 10, 2004

(86) PCT No.: PCT/IL2004/000932
§ 371 (c)(1),
(2), (4) Date: Dec. 5, 2006

(87) PCT Pub. No.: WO2005/032098
PCT Pub. Date: Apr. 7, 2005

(65) Prior Publication Data
US 2007/0088837 A1    Apr. 19, 2007

Related U.S. Application Data

(60) Provisional application No. 60/506,170, filed on Sep. 29, 2003.

(51) Int. Cl.
*H04M 3/42* (2006.01)

(52) U.S. Cl.
USPC ........ 455/414.1; 455/130; 370/466; 370/229; 379/201.03

(58) Field of Classification Search
USPC ............... 455/414.1, 130, 406, 403; 709/220, 709/230, 225, 223; 379/201.03, 201.01, 379/32.03, 230, 221.08, 229; 701/24, 31.6; 370/466, 229
See application file for complete search history.

(56) References Cited

U.S. PATENT DOCUMENTS

| | | | |
|---|---|---|---|
| 6,873,695 B2 * | 3/2005 | Celi et al. | 379/201.12 |
| 6,876,733 B2 * | 4/2005 | Creamer et al. | 379/201.12 |
| 2001/0018746 A1 * | 8/2001 | Lin | 713/201 |
| 2002/0052916 A1 * | 5/2002 | Kloba et al. | 709/203 |
| 2002/0156893 A1 * | 10/2002 | Pouyoul et al. | 709/225 |
| 2002/0169858 A1 * | 11/2002 | Bellinger et al. | 709/220 |

(Continued)

FOREIGN PATENT DOCUMENTS

| | | |
|---|---|---|
| EP | 1345456 | 9/2003 |
| WO | WO 03/067851 | 8/2003 |
| WO | WO 03067851 A1 * | 8/2003 |

OTHER PUBLICATIONS

Quick Definition (module), www.OneLook.com, 1 page.*

(Continued)

*Primary Examiner* — Mahendra Patel
(74) *Attorney, Agent, or Firm* — Wall & Tong, LLP

(57) ABSTRACT

A single platform for the provision of multiple services over a cellular telephone network, comprises a generic definition of a cellular service, which is designed to take specific service-defining parameters, and a parameter setting mechanism for inputting respective service defining parameters to the generic definition, thereby to implement a desired service through the generic definition. The platform thus provides an infrastructure to support numerous services, and reduces the development time for individual services since they can be added as plug-ins to the platform using the generic definition which is shared.

23 Claims, 7 Drawing Sheets

(56) References Cited

U.S. PATENT DOCUMENTS

2003/0041110 A1* 2/2003 Wenocur et al. .............. 709/206
2004/0023644 A1* 2/2004 Montemer ................. 455/414.1
2004/0110462 A1* 6/2004 Forstadius .................. 455/3.01
2005/0101309 A1* 5/2005 Croome ....................... 455/418

OTHER PUBLICATIONS

OneLook Dictionary Search, Quick definitions (infrastructure), www.onelook.com, 2 pages.*
Rudkin et al. "A Scheme for Component Based Service Deployment", Trends in Distributed Systems for Electronic Commerce, International IFIP/GI Working Conference, p. 68-80, 2000. Abstract, p. 68, 69, 71-74.
Office Action for European Patent Application Serial No. 02700546.1, dated Aug. 2, 2013, Alcatel-Lucent USA, Inc., Applicant, 6 pages.
Alonistioti, et al., "An Application Platform for Downloadable VASs provision to mobile users," Oct. 2000, Galway, Ireland.
Housses, et al., "A VHE Architecture for Advanced Value-Added Service Provision in $3^{rd}$ Generation Mobile Communication Networks," Dec. 2000, pp. 69-78, XP010551465, San Francisco, USA.
EP Office Action for European Patent Application Serial No. 04770602.3, dated Jul. 16, 2012, Alcatel-Lucent USA Inc., Applicant, 13 pages.

* cited by examiner

SERVICE PLATFORM FOR CELLULAR TELEPHONY

RELATED APPLICATIONS

This application is a National Phase Application of PCT Patent Application No. PCT/IL2004/000932 having International Filing Date of Oct. 10, 2004, which claims the benefit of U.S. Provisional Patent Application No. 60/506,170 filed on Sep. 29, 2003. The contents of the above Applications are all incorporated herein by reference.

FIELD AND BACKGROUND OF THE INVENTION

The present invention relates to a service platform for cellular telephony and, more particularly, but not exclusively to a scalable platform that allows different services to be included therein with minimum development effort.

The new era of mobile data services introduces a rich world of content, which is delivered over-the-air to mobile devices. Wireless service providers, such as cellular operators, offering data and content-based services to their subscribers in order to increase the average revenue per user (ARPU) and reduce churn. The kind of content services currently available include various media types, such as applications, games, ringtones, images, and audio and video clips. Such content is delivered to mobile devices over various protocols, such as HTTP, WAP, MMS, EMS and SMS.

Wireless data services are consumed by users with mobile devices. A mobile device is a computing unit that can send and receive data packets through a wireless bearer. Examples of such mobile devices are cellular phones, connected PDAs and two-way pagers. The wireless network is maintained by some kind of a service provider, such as a cellular carrier. The device may use various data protocols in order to send and receive over the wireless network. The most common protocols in this context are WAP and TCP/IP, which can be implemented over any wireless network, such as GPRS and UMTS.

In addition to the network connectivity capabilities, different mobile devices have at least some of the following basic capabilities, depending on the generation to which the particular mobile device belongs:
  CPU (e.g., Arm, Strong Arm)
  Operating System (e.g., Symbian, Microsoft Smartphone)
  Short-range connectivity channels (e.g., InfraRed, Blue-Tooth)
  Multi-media capabilities (e.g., color display, polyphonic sounds, digital camera)
  Application runtime environment (e.g., J2ME, BREW),
  Wireless data client (e.g., WAP browser, MMS client)
  Digital Rights Management (DRM) agent (e.g., as defined by OMA)

Modern mobile devices are capable of using these services by downloading over-the-air a wide range of media types, such as ringtones, pictures, screensavers, wallpapers, songs, video clips and applications. Each of these media types could be represented in different formats, such as MIDI for ringtones, GIF/JPEG for pictures, MP3 for songs, MP4 for video clips and J2ME MIDP 1.0/2.0 for (Java) applications.

Thus, in the current art there are numerous services that are offered via cellular telephony. Generally each such service is based on a dedicated server and is designed and developed separately and integrated into the cellular system. Each service thus requires its own development time, which is a major bottleneck in the provision process of the service.

Furthermore, as all of the services are provided as separate entities on separate servers, there is no way in which different services can be made to work together to complement each other.

There is thus a widely recognized need for, and it would be highly advantageous to have, a platform for providing services which is devoid of the above limitations.

SUMMARY OF THE INVENTION

According to one aspect of the present invention there is provided a platform for the provision of services over a cellular telephone network, the platform comprising:
  a generic definition of a cellular service, said generic definition being able to take specific service-defining parameters, and
  a parameter setting mechanism for inputting respective service defining parameters to said generic definition, thereby to implement a desired service through said generic definition.

Preferably, said generic definition comprises at least some of the following features of a service:
  availability,
  discoverability,
  findability,
  buyability, and
  obtainability.

Provisioning refers to the availability of the service as an entity on the network. Discoverability refers to the need for a service to make users aware of its existence. Findability is the way in which users, aware of the existence of the service, can find the service. Buyability refers to the financial conditions under which the service is made available to the consumer, and finally obtainability refers to the way in which the consumer can actually obtain the service. All of these features are generic to content services provided over the cellular network and in the prior art are designed and integrated independently for each service.

Preferably, said generic definition comprises an ability to select between one of a plurality of levels of complexity of content presentation according to a determined capacity level of a receiving telephone.

The platform preferably carries a plurality of services each defined using said generic service and different service defining parameters.

The platform may be configured to allow a plurality of services to be defined using different service-defining parameters applied to said generic service.

The platform may comprise a rule engine together with said generic definition, for operating logic required for said desired service by implementing ones of said service defining parameters that are logical rules.

The platform may comprise an external parameter obtaining mechanism to obtain external parameters for modifying application of a respective desired service to a user.

Preferably, said external parameter is location of a respective mobile telephone, and wherein said modifying comprises modifying said application in accordance with a respective location.

The platform may comprise a plurality of modules, each module carrying said generic definition together with a different arrangement of parameters, thereby to combine different services within said platform.

The platform may support additional services by the incorporation of additional modules.

According to a second aspect of the present invention there is provided a method for the provision of services over a cellular telephone network comprising:

providing a generic definition of a cellular service, said generic definition comprising common features needed for said services, and said generic definition being able to take specific service-defining parameters, and for each one of a plurality of desired services, inputting respective service defining parameters to said generic definition, thereby to implement a desired service through said generic definition.

Preferably, said generic definition comprises at least some of the following features of a service:
availability,
discoverability,
findability,
buyability, and
obtainability.

Preferably, said generic definition comprises an ability to select between one of a plurality of levels of complexity of content presentation according to a determined capacity level of a receiving telephone.

The method may comprise defining a plurality of services each using said generic service and different service defining parameters, and providing each service as a separate module sharing a common interface.

The method may comprise using operating logic required for a respective desired service by implementing ones of said service defining parameters that are logical rules.

The method may comprise obtaining external parameters for modifying application of a respective desired service to a user.

Preferably, said external parameter is location of a respective mobile telephone, and wherein said modifying comprises modifying said application in accordance with a respective location.

According to a third aspect of the present invention there is provided a method for managing a content delivery interface between a content provider and a subscriber wireless communication device, the method comprising:

providing a plurality of modules for the content delivery interface, each module for providing content as part of a different service;

selecting an appropriate one of said modules for the content delivery interface according to a currently desired service; and adding said appropriate module to the content delivery interface, thereby to provide said currently desired service from a platform that supports a plurality of services.

Preferably, said adding said appropriate one of said modules comprises providing a functional alteration for the content delivery interface for interacting with the wireless communication device, according to said currently desired service.

Preferably, said functional alteration comprises a change to a flow of interaction between the content delivery interface and the wireless communication device.

Preferably, said functional alteration comprises a change to the look and feel of the content delivery interface at the wireless communication device.

Preferably, said functional alteration comprises:
Adding a new content type;
Adding a new content delivery protocol;
Adding a new device and adjusting the user interface to its browser and its display characteristics;
Adding a new page (e.g., includes content items that are offered in a special discount);
Adding content bundles that include multiple content items;
Changing the look and feel of the service, including at least one of colors, fonts, icons, formatting and page layout; and
Changing parameters of the service.

In an embodiment, said functional alteration comprises a change in a respective service according to an identity of a subscriber, a service package of said subscriber, a preference of said subscriber and a type of wireless communication device.

Preferably, said change comprises dynamic adaptation of the service, optionally including at least one of:
Matching the output format and presentation to the device type;
Filtering of content, based on at least one of permissions, compatibility to the device, subscriber preferences, and content classification;
Selection of a language;
Dynamic flow; and
Adjustment of delivery protocol based on the content type and the device.

The method may comprise providing each module with a generic service definition and customizing ones of said modules for services it is desired to provide.

Preferably, the content delivery interface further comprises a service directory for locating a service, such that said adding said appropriate module further comprises altering a listing in said service directory as necessary when a service is added, removed or altered.

Preferably, the content delivery interface further defines a presentation for providing an output of said service to the wireless communication device, such that said functional alteration comprises altering said presentation as necessary when a service is added, removed or altered.

Preferably, said functional alteration comprises altering a logic of said service.

According to a fourth aspect of the present invention there is provided a service delivery platform for an interface between a content provider and a wireless communication device, comprising:

a plurality of services for being provided to the wireless communication device by the content provider;

a service controller for receiving a request for a service from the wireless communication device and for activating said service according to a service logic, wherein said service logic comprises at least one rule for determining at least one of whether and how said service is to be provided; and a service framework for said plurality of services, configured to enable ones of said services to be added, removed or changed.

The platform may comprise a service directory for listing ones of said services, and wherein said service controller is configured to search said service directory for said service upon receiving said request.

Preferably, said service comprises a plurality of operations to be performed and a response to be returned to the wireless communication device.

The platform may comprise a presentation for presenting said response of said service.

Preferably, said presentation comprises a presentation assembler for collecting data and preparing said data for said response to the wireless communication device.

Preferably, an operation of said service is performed according to at least one rule.

The method may comprise a rule operation for constructing the condition for said rule.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
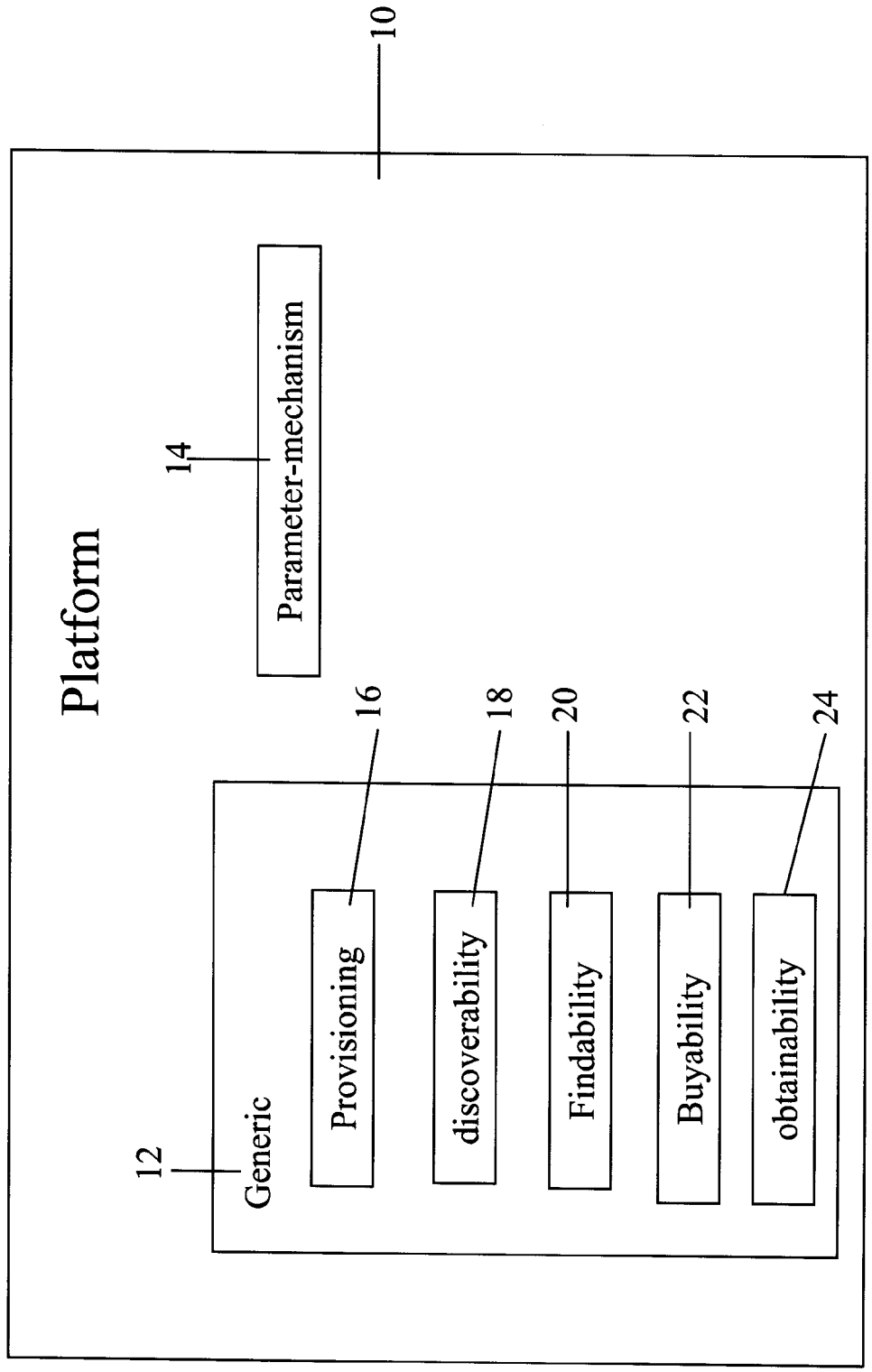
FIG. 1 is a simplified system level block diagram showing a service providing platform according to a first preferred embodiment of the present invention.

The present embodiments comprise a platform for provisioning of content-type services over a network, particularly of services provided over the cellular network. The platform includes a generic definition of a service which can be customized separately for individual services that it is desired to provide. The platform thus provides an infrastructure incorporating the common features of the different services so that development of an individual service is reduced to defining the delta for that service. Development and integration of the different aspects of the generic definition has already been carried out. A further advantage is that a single platform supports a full range of services, thus making it easy to integrate the services.

The principles and operation of a platform according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which illustrates a platform for the provision of services over a cellular telephone network, according to a first preferred embodiment of the present invention. The platform 10 comprises a generic definition 12 of a cellular service. The generic definition is able to take specific service-defining parameters which turn it from a generic into an actual service. The platform also has a parameter setting mechanism 14 for allowing a service provider to input respective service defining parameters to the generic definition, and thereby to implement a desired service via the generic definition.

The generic definition includes the following features that characterize a content service over the cellular network and which are shared between all services. First of all there is provisioning 16, or the availability of the service as an entity on the network. Secondly there is discoverability 18, the need for a service to make users aware of its existence. Thirdly there is findability 20, the way in which users, aware of the existence of the service, can find it. Fourthly there is what may be termed buyability 22, the financial conditions under which the service is made available to the consumer, and finally there is obtainability 24, the way in which the consumer can actually obtain the service. All of these features are generic to content services provided over the cellular network and to date are designed and integrated independently for each service. The platform of the present embodiments provides these features in a single integration and allows the service providers merely to have to define parameters in order to implement their different services.

The generic definition is implemented at platform level, and thus greater resources can be concentrated on its implementation. Features which are generally too expensive to provide using separate development are now easy to provide. Thus for example the generic definition may comprise an ability to detect the capacity of a telephone to receive data and tailor the content accordingly. For example it may detect that one telephone is a third generation telephony device and provide the content as video. It may detect that another device is a two and a half generation device and send the data as a color image. Hence the individual service provider merely needs to provide the content, the platform already includes the ability to detect the type of telephone.

It will be appreciated that using the platform, enhancements may be made to the generic part of the service. Thus new features can be provided for a whole range of services via a single modification carried out at platform level.

The platform allows a whole range of services to be defined from the generic service, by setting different service defining parameters. The result is a single platform that supports a range of services.

Figure 2:
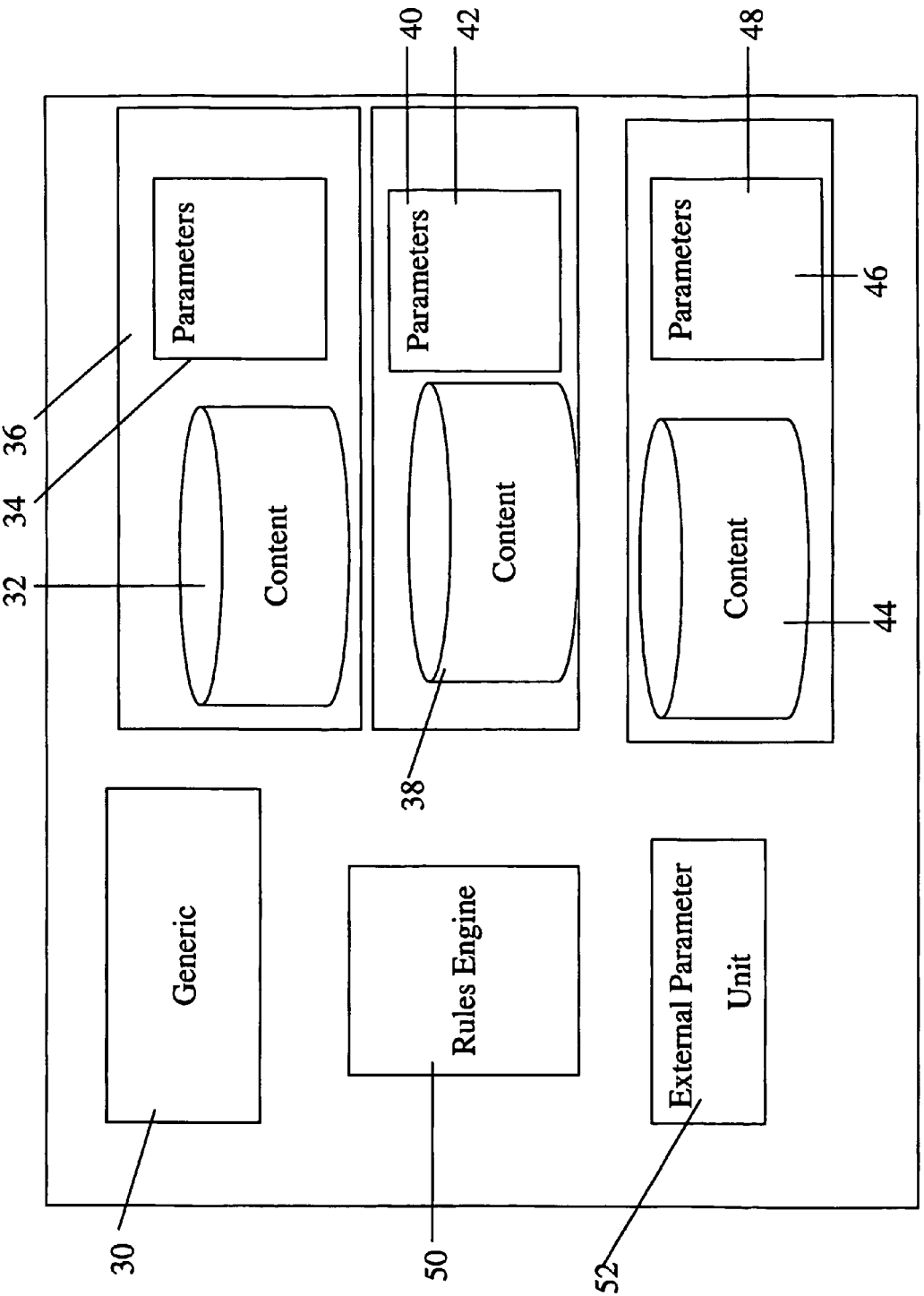
FIG. 2 is a simplified system level block diagram showing an alternative aspect of the platform according to the embodiment of FIG. 1.

Reference is now made to FIG. 2, which is a block diagram of the platform of FIG. 1, showing the generic definition together with modules implementing individual services, and with implementation features. Generic definition 30 is used together with content 32 and parameters 34 to set up a first service in a first service module 36. Likewise a second service is set up using content 38 and parameters 40 in second service module 42. A third service is set up using content 44 and parameters 46 in third service module 48.

The platform comprises a rule engine 50, which operates logic required for a desired service by implementing those of the service defining parameters, including parameters which are themselves logical rules, or which form part of or implement logical rules.

A preferred embodiment also includes an external parameter obtaining mechanism 52 to obtain external parameters for modifying application of a respective desired service to a user. The kind of external parameter obtained may for example be the location of a respective mobile telephone, in which case the service may be modified in accordance with the detected location.

As shown, the platform includes a plurality of modules, each module carrying the generic definition together with a different arrangement of parameters and/or content, thereby to combine different services within the platform.

The platform is able to support additional services by the incorporation of additional modules. That is to say, new services are simply plugged into the existing platform by providing the relevant content and setting the parameters.

Figure 3:
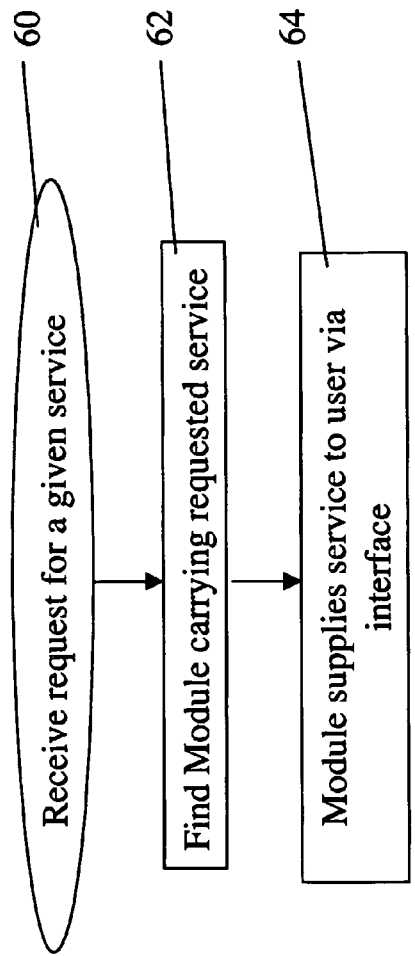
FIG. 3 is a simplified flow diagram illustrating the selection of a service from a plurality of services on the platform by a user, according to a preferred embodiment of the present invention.

Reference is now made to FIG. 3, which is a simplified flow chart showing how a platform supporting a multiplicity of services can be used. The platform as implemented manages a content delivery interface between various content or service providers and a subscriber wireless communication device, and the provision of services via the platform comprises stages as follows, firstly a stage 60 of providing separate modules for the content delivery interface as described above, in which each module provides content as part of a different service. Secondly there is a stage 62 of selecting an appropriate module for the content delivery interface according to a currently desired service, as indicated by the user. For example if the user requests a weather forecasting service then a module defined for a weather forecasting service is selected. If the user desires ringtones then a module that defines a service for providing ringtones is selected, etc. In a stage 64 the selected module is added to the content delivery interface, to provide to the user the currently desired service.

The application of the module to the interface implies making a functional alteration to the interface. Such a functional alteration gives the characteristic look and feel of the requested service at the requesting cellular device. This is aside from providing the desired content.

The functional alteration can include any of the following:
Adding a new content type.
Adding a new content delivery protocol.
Adding a new device and adjusting the user interface to its browser and its display characteristics.
Adding a new page (e.g., including content items and emphasizing that they are part of a special offer or discount).
Adding content bundles that include multiple content items
Setting or changing colors, fonts, icons, formatting and page layout
Changing various presentation related parameters of the service.
Using externally obtained parameters, is possible on a per service basis to make changes to the way in which the service is provided to the requesting user on the basis of an identity of a subscriber, a service package of said subscriber, a previously indicated or derived preference of the subscriber and a type of wireless communication device.

Changes to the service on the basis of external data may include dynamic adaptation of the service to changing conditions. These dynamic changes may optionally include any of:
Matching the output format and presentation to the device type;
Filtering of content, based on at least one of permissions, compatibility to the device, subscriber preferences, and content classification;
Selection of the language;
Dynamic flow; and
Adjustment of delivery protocol based on the content type and the device.

The content delivery interface preferably comprises a service directory for locating a service. Whereas such a service directory is trivial with the present platform, such a feature is difficult with the prior art where the services are located on separate servers. With the present platform, not only is it straightforward to provide the directory but furthermore the directory can be automatically updated whenever a new service is added since it simply has to detect the addition of a new model and find out the name, a standard function of any file manager.

The platform may also include a presentation for providing an output of the service to the wireless communication device. The presentation may be altered as necessary for individual services or overall when a service is added, removed or altered.

Figure 4:
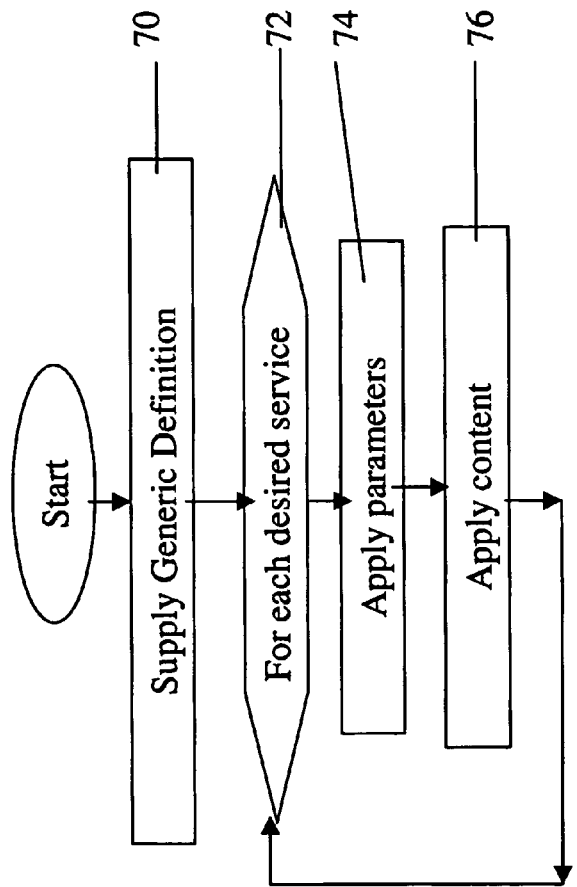
FIG. 4 is a simplified flow diagram illustrating the programming of the platform to include a generic service definition and specific services based thereon, according to a preferred embodiment of the present invention.

Reference is now made to FIG. 4 which is a simplified flow chart illustrating the procedure for setting up the platform and then setting up the individual services on the platform. The method comprises a first stage 70 of providing a generic definition of a cellular service. As explained above, the generic definition comprises common features needed for the various services. The generic definition is able to take specific service-defining parameters, and to accept the specific content of the given service. Then, for each of a plurality of desired services a loop 72 is carried out. The loop comprises a stage 74 of inputting respective service defining parameters to the generic definition, and a stage 76 of adding the service specific content. The loop can be carried out every time it is desired to add a new service, and for the vast majority of services it will be appreciated that adding content is an ongoing process with content being dynamically updated.

Figure 5:
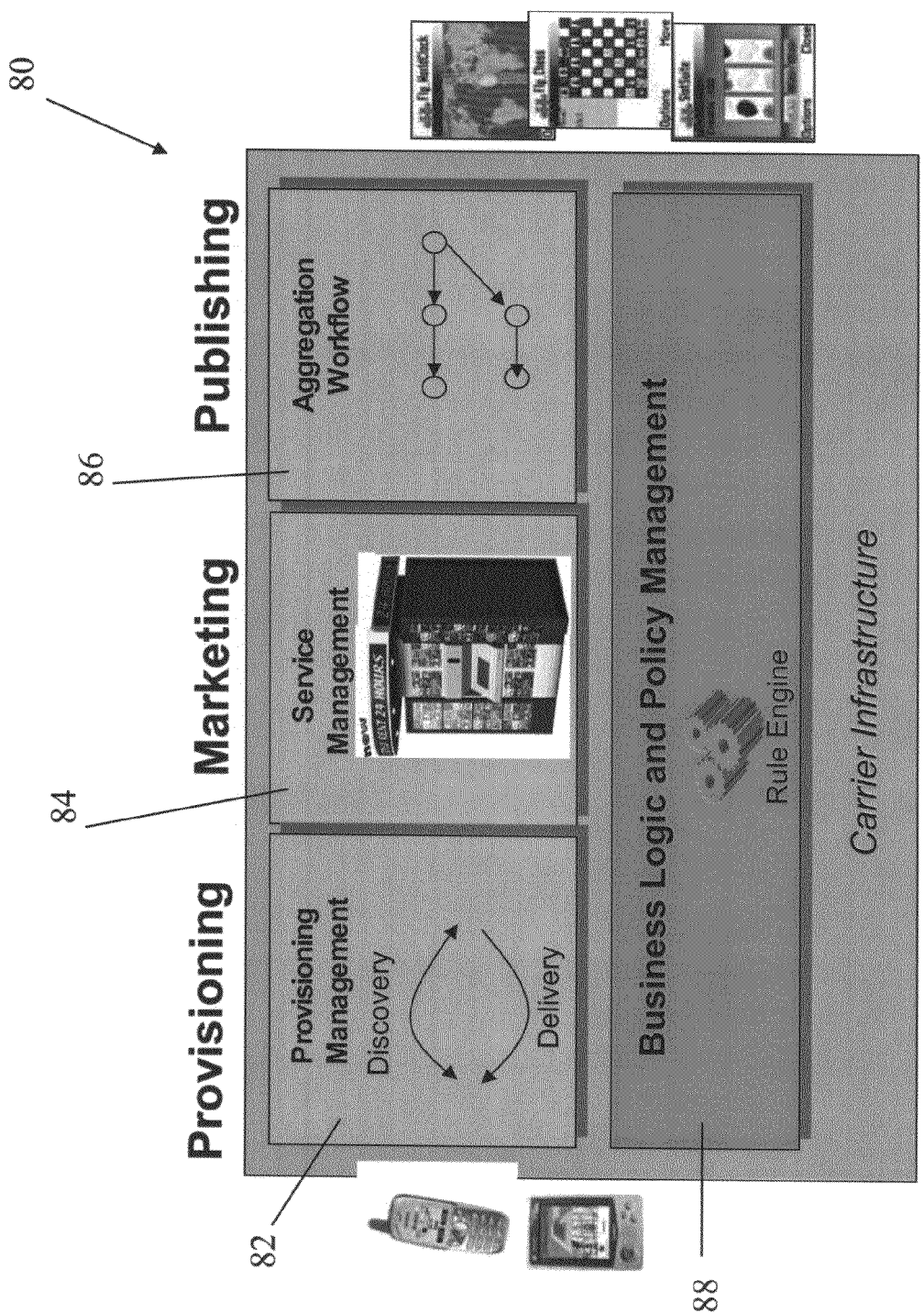
FIG. 5 is a simplified system block diagram illustrating the platform of FIG. 1 from a further aspect.

Reference is now made to FIG. 5, which is a system level block diagram of a platform according to a preferred embodiment of the present invention for providing services. The platform is a carrier-grade platform, which enables wireless service providers, such as mobile carriers, to manage, provision and bill for downloadable content services. The platform facilitates the delivery of multiple content types to different devices using different protocols. Content types may include Java applications, ring tones, icons, images and audio. Because the generic part of the service has already been predefined, the platform allows carriers to concentrate on the content part of their service to match subscribers' needs and changing habits. Through the platform, carriers can offer a wide selection of billing models, subscription packages and service bundles, again available through the generic definition.

The platform is scalable, since a new service is simply a matter of adding a new module, and robust, since the generic part of the service has been separately created and tested. The service uses reliable infrastructure components including application server, messaging server and database server and allows demand for new and increasingly complex data services to be fulfilled in minimal time since it can be based on the existing generic definition.

The generic definition can take into consideration the resource constraints of the different mobile devices, thus saving the content provider the task. Subscribers can personalize their service by predefining their interests and habits, again requiring very little effort on the part of the content provider since the generic definition takes care of these issues. The platform is able to provide the appropriate content menus, service notifications and billing models that best fits the subscriber preferences.

The platform of the present embodiments is intended to support the evolving needs and requirements of mobile carriers when launching and managing wireless data services. The platform facilitates the process of content provisioning to ensure a successful and cost effective service.

End-to-end support for content aggregation workflow. the platform provides support for the workflow, by which downloadable content is introduced by content providers and aggregated into a chargeable service by a service provider. The platform provides an interface for content providers to submit multiple content items and assign billing models to them. It also provides tools for the service administrator to manage the process of validating and publishing submitted content items, in order to make them available for eligible subscribers. Such content validation processes are suitable for multiple content types, content providers and internal policies of the service provider.

Provisioning of multiple content types. the platform's generic and extendible infrastructure is designed to support multiple types of content and multiple devices. Such a spectrum of content types allows the service provider to provide integrated content provisioning services through a single platform without the burden of dealing with the complexity of different underlying technologies. In addition, the service provider is able to provide the subscriber with a single access point to a comprehensive and rich content service, which includes multiple types of content, for example through a directory.

Flexible billing models. The platform enables the service provider to easily define and customize different billing policies, and to assign them to different content items and content bundles. The policy consists of a set of rules, which are structured according to the Event Condition Action (ECA) model. In some cases, a complementary client-side policy exists on the device and enforces application licensing terms. These rules are triggered by events that are generated by the system (e.g., content download) or by the application (e.g., the user has won a game or scaled to a higher game level).

Advanced service marketing tools. the platform provides various tools that facilitate the quick uptake and return of investment (ROI) of emerging content download services. Such marketing tools enable promotion campaigns, such as discounts, notifications of new content items and quick access lists for content items. In addition, the platform supports micro-segmentation of services, through the definition and characterization of service bundles in fine granularity for different market segments, down to the level of the individual subscriber. For example, a service bundle can offer the new and exciting "Students" service package in addition for five free ring tones during the first subscription month.

Highly customized system. The platform system is highly customizable, including features such as possible support for multiple languages, content attributes, collected statistical measurements, requested information from content providers and subscribers, access control management, and more. The platform features a rule engine, as explained above, that governs various policies in the system, such as billing, system management, provisioning flow and notifications. The rule engine grants great flexibility for the carrier as the foundation for managing a successful service. Without the rule engine, changing service definition and business logic could be highly expensive and time consuming.

Scalable design. The platform features a scalable design, which can be expanded easily in order to provide additional system capacity. The platform solution is built of components, which can be expanded easily by adding more CPUs/RAM (Vertically) or by adding more components (Horizontally). The load is divided between the components using load balancers. In order to enhance system capacity, new components can be installed easily, and added to the platform cluster. Then, they are activated, by changing the settings of the router/load balancers.

Monitoring and reporting. the platform provides online measurements (e.g., number of downloads) and alerts (e.g., overloaded server) through an extendible management tool or through an SNMP based management system. In addition, the system generates reports based on statistical information, which is periodically gathered. These reports provide valuable information for fine-tuning the service and matching it to subscribers habits and consumption patterns. Selective information is provided also to content providers and to subscribers. Content services often provide reporting features but now the reporting can be related to combinations of different services.

Secure architecture. The platform, via its generic definition, introduces a comprehensive security approach that includes enhanced fraud detection, digital right management as well as application scanning. This combination ensures protecting the commercial viability of data services as well as minimizing the associated risk of revenue losses. In addition, the various interfaces to the platform system are secured both by a flexible access control mechanism that enables the service provider to prevent unauthorized access, and by substantial mechanisms (e.g., SSL) that protect the system against various attacks, such as impersonation, eavesdropping and tampering of data.

Referring now to FIG. 5, the platform 80 includes several functional units. Firstly there is a provisioning management unit 82 that provides personalized content discovery and over-the-air content delivery services for mobile user (subscribers).

A service management unit 84 allows the service provider to manage service packages, subscribers, content providers, devices, pricing and discounts, notifications and reports.

An aggregation workflow unit 86 controls the process by which content items are submitted by content providers, and verified, tested, approved and published by the service provider.

A business logic and policy management unit 88 is governed by the rule engine, and manages the various policies in the system, such as billing.

In the following, various features of the generic definition are considered in greater detail.

Content Provisioning

Wireless Content Provisioning is the process by which content is discovered by mobile users and delivered over-the-air (OTA) to their mobile devices. The platform provides a context-aware provisioning service, which is dynamically adjusted to the context of the request such as the identity of the user and his preferences, and the type of device. The platform's content provisioning architecture utilizes extendible provisioning adapters in order to support multiple content types, protocols and devices.

The Provisioning process includes the following stages:

Authentication of the subscriber

Discovery of content by the subscriber through various methods

Brokering (purchase) of the content

OTA Delivery of the Content Item to the Device

The platform enables dynamic discovery and delivery of content by subscribers. Subscribers browse through the content directory, which is filtered by service package, preferences and device type. Each category is displayed as a menu or folder within the discovery application (DA), which can be either a micro-browser or a resident application written specifically for content discovery. The dynamically generated menus are formatted according the markup language used by the discovery application. The service is accessible from various types of browsers (e.g., WAP browser, Web browser) that support different markup languages, such as WML and HTML. The delivery service automatically identifies the browser based on the HTTP request header properties, such as User-Agent, and returns matching formatted menus.

Provisioning Methods

The platform supports multiple methods of provisioning, that are initiated by different players, as follows:

User-initiated. Content discovery and delivery is initiated by the subscriber:

Device-initiated. The service is accessed through a discovery application, such as a WAP browser.

Web-initiated. The subscriber discovers and purchases content through a Web browser.

SMS-initiated. The subscriber discovers and orders content items by sending SMS messages that include short codes.

IVR-initiated. The subscriber discovers and orders content items through an interactive voice response (IVR) interface.

Server-initiated. Content delivery is initiated by the platform, as a result of:

New content notifications. Publishing of new content items triggers notifications that are sent to interested subscribers and allow them to download these items.

Customer care. A customer care agent may push content items to subscribers upon request.

Provisioning Adaptors

The platform system contains a flexible infrastructure for provisioning of various content types. It is possible to define different provisioning adaptors for different content types, protocols and devices. These provisioning adaptors are entered seamlessly into the provisioning flow. They define the protocol with the device (e.g., HTTP or SMS) for delivering the content, and the processing that is performed on these content before delivery.

For example, the Mobile Information Device Profile (MIDP) standard defines the protocol, by which Java 2 Micro Edition (J2ME) applications are delivered OTA to mobile devices. According to this protocol, the interaction between the device and the download server, involves several HTTP requests. The first request is for the Java Application Descriptor (JAD), which describes the attributes of the application (name, version, size, etc.). The second request is for the application itself, which is provided in a Java Archive (JAR) file. Once the application is installed successfully, the device sends an install notification, as an HTTP post request to the URL, which is defined in the descriptor.

The need for provisioning adapters stems from the fact that there are multiple download protocols (MIDP OTA, OMA OTA, Nokia COD, etc.) and multiple variations for each protocol that are implemented by different devices. Thus, there is a need adjust the download protocol and its parameters to each device.

Challenges

The main challenge in the management of wireless content provisioning services is the need to cope with dynamic marketing and technology driven requirements. That is, for each service provider and throughout the lifespan of each system, the requirements of the content delivery interface are constantly evolving. These requirements define both the flow and the look & feel of the wireless content provisioning services that are offered to subscribers. Examples of such requirements are:

Add a new content type.

Add a new content delivery protocol.

Add a new device and adjust the user interface to its browser and its display characteristics.

Add a new page that includes content items that are offered in a special discount.

Add the concept of bundles, which means that the subscriber may purchase content bundles that include multiple content items.

Change the look & feel (presentation) of the service: colors, fonts, icons, layout, etc.

In addition, it is important to note that wireless content provisioning services are context-sensitive. That is, the services that are provided to subscribers may be different, depending on the subscriber's identity, affiliation, service plan, preferences, device type, etc. The dynamic adaptation of the service includes:

Matching the output format and presentation to the device type.

Filtering of content, based on permissions, compatibility to the device, subscriber preferences, content classification, etc.

Selection of the language.

Dynamic flow, e.g., if the subscriber has already purchased a bundle then don't show him a purchase page for content items that are included in this bundle.

Adjustment of delivery protocol based on the content type and the device capabilities.

Service Delivery Framework

The platform service delivery framework enables the construction and customization of Web-based interfaces that are provided by the platform. The framework controls the flow, logic and presentation of user interfaces. It is applicable both for WAP-based user interfaces and for Web-based services, and for other kinds of browsing including SMS browsing, IVR browsing, and video browsing.

Figure 6:
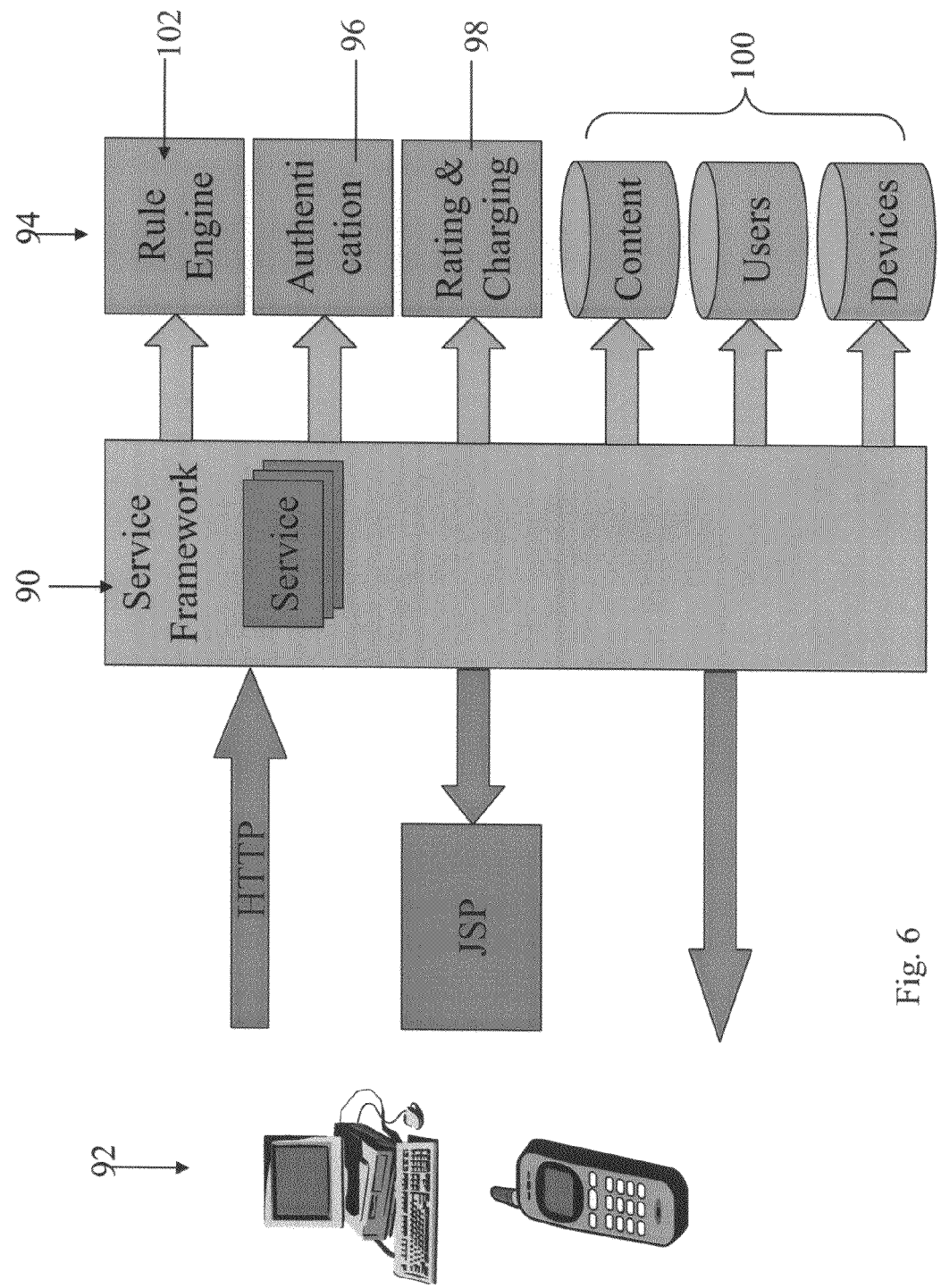
FIG. 6 is a simplified system block diagram showing the aspect of FIG. 5 in greater detail.

The high-level service architecture is depicted in FIG. 6, to which reference is now made. A service framework 90 mediates between mobile devices 92 and the various engines and databases 94. Each incoming HTTP request is handled by the service framework. The framework 90, which serves as a container of services, allocates the appropriate service for handling the request. The service may use various components such as authentication 96, rating and charging 98, and access various repositories, 100, in order to fulfill the request. The service framework itself uses rule engine 102 in order to make some decisions regarding the flow between services. Some of the services may have presentation, which is rendered through JSP pages. Others may return a response directly to the client (e.g., when delivering a Java application).

Figure 7:
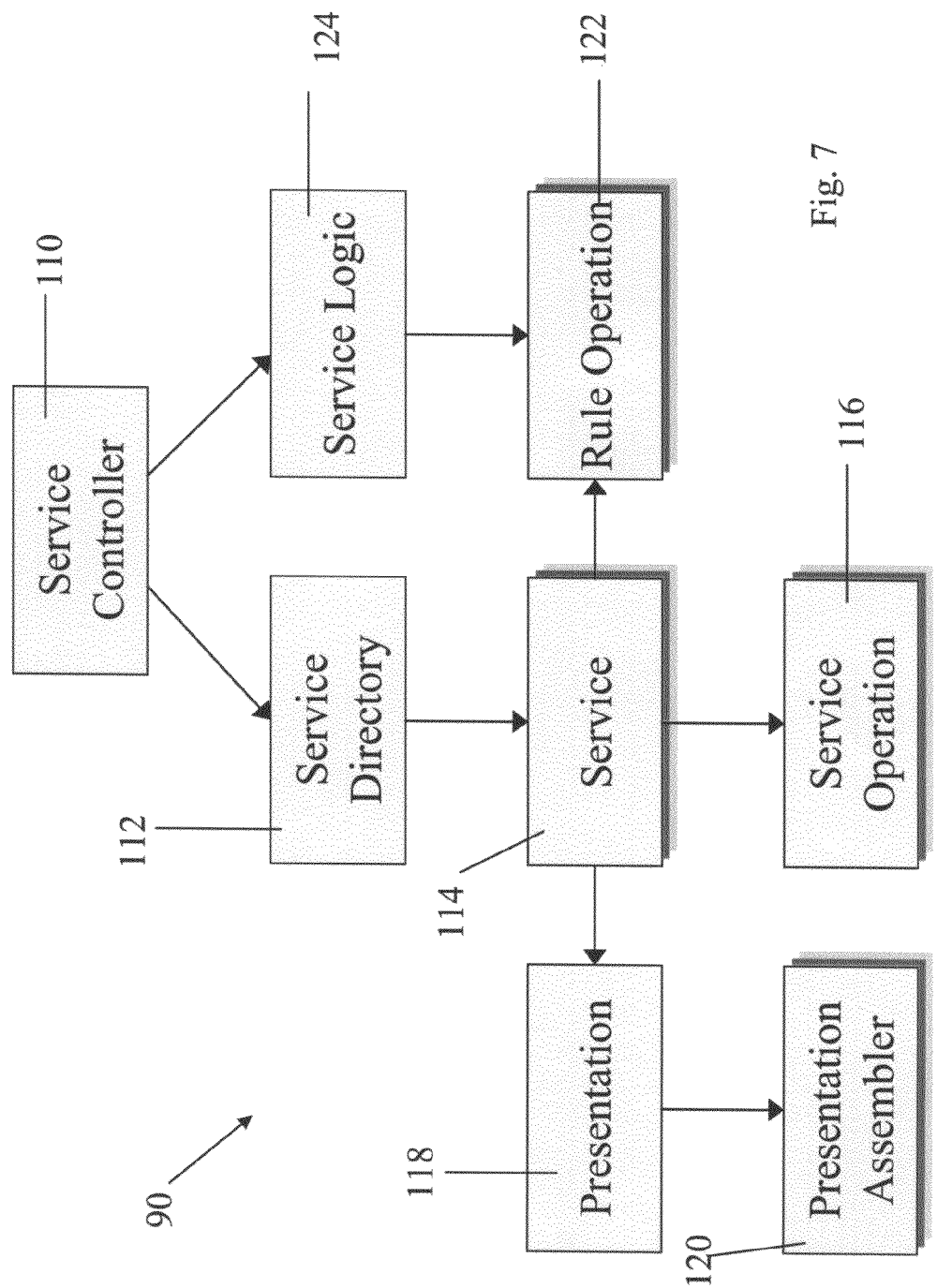
FIG. 7 is a simplified system block diagram showing in greater detail the features of FIG. 6.

Reference is now made to FIG. 7, which is a system-level block diagram which shows in greater detail the Service Delivery Framework 90.

Framework 90 includes the following:

Service Controller 110—responsible for receiving incoming HTTP requests and routing them to appropriate service.

Service Directory 112—a registry for all the services in the framework.

Service 114—handles an incoming request by performing some operations and returning a response. A service may be composed of operations, assemblers and encoders or act as a black box.

Service Operation 116—performs a specific task in the context of a service.

Presentation 118—responsible for presenting the response of the service (through a JSP).

Presentation Assembler 120—collects data and prepares it for presentation.

Service logic 122—controls the flow between services, based on rules. It may decide to execute a requested service or forward (logical) the request to another service.

Rule operation 124—constructs the condition that is used in a rule.

Figure 8:
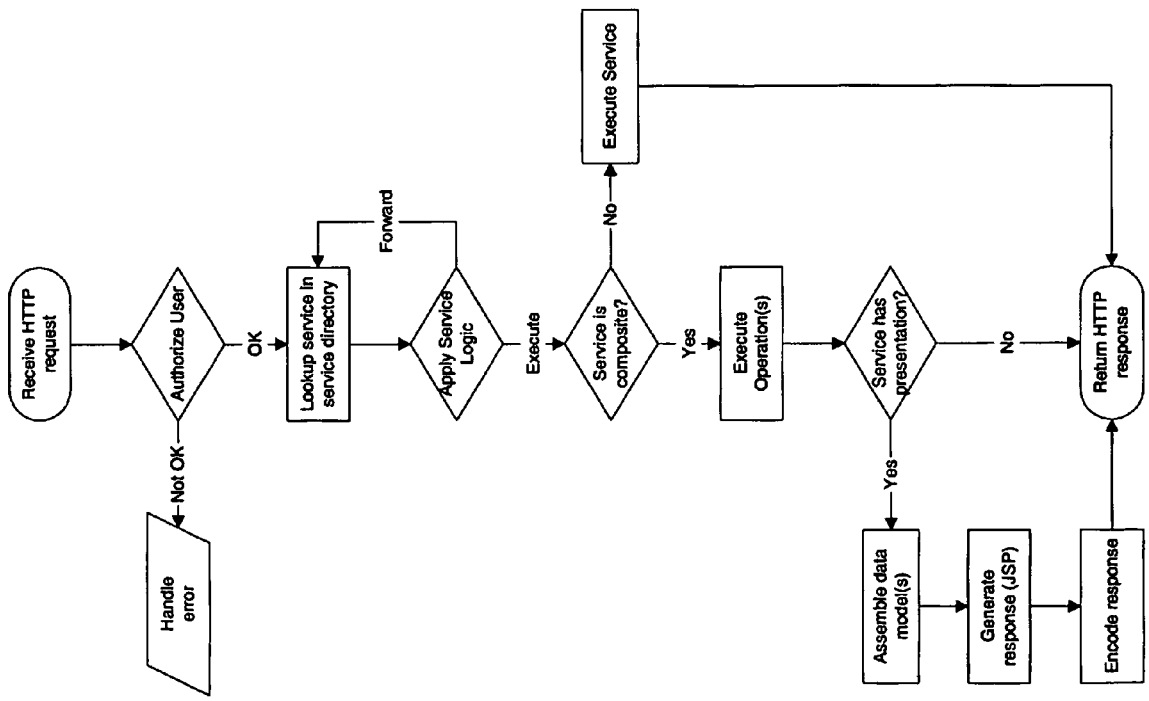
FIG. 8 is a simplified flow diagram illustrating the response of the platform of the present embodiments to a service request from a user.

Reference is now made to FIG. 8, which is a simplified flow diagram illustrating the flow involved in serving an incoming request.

An incoming request preferably includes the name of the requested service in the URL.

The platform authenticates the user who sent the request and checks whether he has a permission to use the requested service.

If the user is authorized, the platform looks up the service in the service directory.

If the service has logic, then the associated rules are applied through the rule engine. This logic determines if the request should be handled by the requested service or forwarded (internally) to another service. If there is no logic, the service is executed unconditionally.

If the service is implemented as a black box, the corresponding code is executed.

If the service is composite, the service operations are executed in a sequence.

If the service has a presentation:

The information, which is required for the data model: is assembled. The data model is accessible in the context of the JSP.

The request is forwarded to a JSP, which is responsible for generating and formatting the presentation. The selection of the JSP may depend on the device model.

If an encoder is defined, the result of the JSP is processed by it.

Finally, the HTTP response is returned to the client.

Service

A service is a logical unit that handles an HTTP request. It is pointed out that the service as described here within the service flow is not the same as the overall content service which the user requests and which is provided, but here denotes an element of that service. Each service is responsible for a specific task such as displaying a menu, performing a search or delivering a content item. The definition of a service includes the following elements:

Service parameters—a list of input and output parameters for the service (see 0)

Service patterns—a URL pattern that is used for accessing the service. The URL pattern is added as a suffix to the URL of the main servlet. It may include the value of service parameters, denoted by curly brackets (e.g., {node}).

Service operations—a list of service operations.

Presentation—There are 3 possible values for this parameter: the name of a presentation, empty value which means no presentation or @runtime@ which means that the presentation is determined during runtime based on the URL and the service operations.

Attributes:

Name—the name of the service.

Must have session—indicates if the service can only be accessed with a valid session.

Need login—requires subscriber authentication.

Entry point—an entry point to the system.

Permission—the name of the required permission for accessing this service.

Has logic—denotes that the service is associated with a rule in the service logic.

Expired—denotes how much time the URL for the service remains valid.

Put in back stack—indicates if this service should be included in the back stack of the browser.

Reentry allowed—indicates if this service can be reentered during the same session.

Service Parameters

Service parameters can be specified in the one of the following types:

Input parameter—a parameter that is provided as an input to the service. Its attributes include:

Name—the name of the parameter

Source—the source of the parameter:

Configuration—read from system configuration

Post—passed as an HTTP Post parameter

Session—stored in the session

Const—a constant value that is specified in the service directory

URL—encoded in the URL

Param—receives the value of another parameter.

Value—the value of the parameter. The value must be present if the parameter is constant or appears in the URL pattern.

Type—the data type of the parameter: boolean, byte, date, double, file, float, integer, long, short, string, record, list or map.

Output parameter—a parameter that is generated as an output of the service. Its attributes include:

Name—the name of the parameter.

Dest—the destination of the parameter:

Session—stored in the session.

Request—forwarded in the HTTP request to another service.

Type—the data type of the parameter: Boolean, byte, double, float, integer, long, short, string or record.

Const—denotes that the value of the parameter is constant

Cleanup parameter—a parameter that is removed from the session or the request by the service. Its attributes include:

Name—the name of the parameter.

Dest—the location of the parameter:

Session—stored in the session.

Request—forwarded in the HTTP request to another service.

Service Operation

Service operations are the building blocks of services in the platform. A service may be composed of multiple operations, which are executed in a sequence. The definition of an operation includes the following elements:

Operation Name

Operation parameters—parameters that are provided for the operation.

Operation Parameters

Each operation may have input and output parameters. Output parameters are passed as input parameters to the next operation in the chain. In addition, the operation has access to the parameters of the service in which it is included.

The attributes of each explicit input parameter include:

Name—the name of the parameter.

Value—the value of the parameter.

Type—the data type of the parameter: Boolean, byte, double, float, integer, long, short, string or record.

Presentation

The presentation is optionally associated with a service. It defines how the output of the service is presented to the user. The definition of a presentation includes the following elements:

Presentation parameters—a list of parameters that are provided for the presentation.

Presentation headers—HTTP headers that are generated in the response.

Presentation Assemblers.

Attributes:

Name—the name of the operation.

JSP Name—the name of the JSP that is associated with the presentation.

Encoder—the name of the encoder that is applied on the result of the JSP.

Print response—denotes if the response should be written to the debug log.

Presentation Parameters

Presentation parameters are provided as an input to the presentation. The attributes of each parameter include:

Name—the name of the parameter.

Value—the value of the parameter (if it is static).

Type—the data type of the parameter: boolean, byte, date, double, file, float, integer, long, short, string or record.

Source—the source of the parameter:

Configuration—read from system configuration.

Const—specified in the service directory file as a constant.

URL—encoded in the URL.

Presentation Headers

The presentation headers define the HTTP headers that are included in the HTTP response. A presentation header includes a name and a value. The following HTTP header types are supported:

Content Length—the value is automatically calculated by the system.

String—a header with a string value (e.g., Content-Type).

Date—a header with a date value.

Presentation Assemblers

Presentation assemblers are responsible for collecting data into a Page Model that is used by the JSP. The presentation assembler has a name and can receive parameters that have the following attributes:

Name—the name of the parameter.

Value—the value of the parameter.

Type—the type of the parameter: Boolean, byte, double, float, integer, long, short or string.

In addition, the assembler has access to the parameters of the presentation and the parameters of the service in which it is included.

The output of the presentation assembler is a Page Model. The page model can include the following elements:

Field

Table

Tree

Each of these elements is associated with a name.

Service Logic

The service logic contains ECA rules that control some of the transitions between services. Each rule in the service logic is defined by the following elements:

Event—the name of the event is identical to name of the service that triggers the rule. This is applicable to services which are defined as "has logic".

Condition—the condition (optional) can be composed of service operations and other expressions. The condition returns a Boolean result that determines which action to execute.

Action—the action can be one of the followings:

Execute Service—execute the current service

Forward To Service—forward to another service, where the target service name is provided as a parameter.

Rule Operation

A rule operation is a component that can be used in service logic rules. Each rule operation checks a certain condition that allows the service logic to make a decision about the next service to call. Each rule operation may require input parameters and provide output parameters. The input parameters that a rule operation receives are a subset of the input parameters of the service that triggered the rule. The output parameters are available for the service that is called as a result of the rule.

It is expected that during the life of this patent many relevant cellular devices, cellular services and cellular content delivery systems will be developed and the scope of the corresponding terms herein, are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for managing a content delivery interface between a content provider and a subscriber wireless communication device, the method comprising:

providing a plurality of modules for the content delivery interface, each module for providing content as part of a different service, each module being associated with at least one content type, at least one content delivery protocol and at least one device;

providing a definition incorporating common features of different services;

selecting one of said modules for the content delivery interface according to a currently desired service and said definition wherein said definition includes consideration of resource constraints of different devices; and adding said selected module to the content delivery interface, thereby to provide said currently desired service from a platform that supports a plurality of services;

wherein said adding said selected one of said modules comprises providing a functional alteration for the content delivery interface for interacting with the wireless communication device, according to said currently desired service;

wherein said functional alteration comprises a change to a flow of interaction between the content delivery interface and the wireless communication device;

wherein said functional alteration comprises altering a logic of said service; and wherein said functional alteration comprises at least one functional alteration from a group of functional alterations comprising:
  adding support for a new content type;
  adding support for a new content delivery protocol; and
  adding support for a new device.

2. The method of claim 1, wherein said group of functional alterations further comprises:
  adjusting the content delivery interface according to a browser characteristics of the device;
  adjusting the content delivery interface according to display characteristics of the device;
  changing a look and feel of the content delivery interface by modifying at least one of colors, fonts, icons, formatting and page layout characteristics.

3. The method of claim 1, wherein said group of functional alterations further comprises:
  adding a new page;
  changing parameters of the service; and
  adding content bundles that include multiple content items.

4. The method of claim 1, wherein said functional alteration comprises a change in a respective service according to an identity of a subscriber, a service package of said subscriber, a preference of said subscriber and a type of wireless communication device.

5. The method of claim 4, wherein said change comprises dynamic adaptation of the service, optionally including at least one of:
  matching the output format and presentation to the device type;
  filtering of content, based on at least one of permissions, compatibility to the device, subscriber preferences, and content classification;
  selection of a language;
  dynamic flow; and
  adjustment of delivery protocol based on the content type and the device.

6. The method of claim 1, comprising providing each module with a service definition and customizing ones of said modules for services it is desired to provide.

7. The method of claim 6, wherein the content delivery interface further comprises a service directory for locating a service, such that said adding said selected module further comprises altering a listing in said service directory when a service is added, removed or altered.

8. The method of claim 6, wherein the content delivery interface further defines a presentation for providing an output of said service to the wireless communication device, such that said functional alteration comprises altering said presentation when a service is added, removed or altered.

9. A method for managing a content service platform, the content service platform supporting subscriber access to content services via a content delivery interface adapted for subscriber wireless communication devices, the method comprising:
  providing a plurality of modules for the content delivery interface, each module for providing content as part of a different service, each module being associated with at least one content type, at least one content delivery protocol and at least one device;
  providing a definition incorporating common features of different services;
  selecting one of said modules for the content delivery interface according to a currently desired service and said definition wherein said definition includes consideration of resource constraints of different devices; and
  adding said selected module to the content delivery interface, thereby to provide said currently desired service from a platform that supports a plurality of services;
  wherein said adding said selected one of said modules comprises providing a functional alteration for the content delivery interface for interacting with the wireless communication device, according to said currently desired service;
  wherein said functional alteration comprises a change to a flow of interaction between the content delivery interface and the wireless communication device;
  wherein said functional alteration comprises altering a logic of said service; and
  wherein said functional alteration comprises at least one functional alteration from a group of functional alterations comprising:
  adding support for a new content type;
  adding support for a new content delivery protocol; and
  adding support for a new device.

10. The method of claim 1, wherein said wireless communication device comprise any of a mobile phone, a smart phone, and a personal digital assistant (PDA).

11. The method of claim 1, wherein said wireless communication device comprise a computing unit configured to send and receive data packets through a wireless bearer.

12. The method of claim 1, wherein said resource constraints of different devices are defined according to one or more of network connectivity capability, Central Processing Unit (CPU), operating system, short-range connectivity channels, multi-media capabilities, application runtime environment, wireless data client, Digital Rights Management (DRM) agent and display characteristics.

13. The method of claim 1, wherein said platform that supports a plurality of services comprises a service directory for listing ones of said services, and wherein a service controller is configured to search said service directory for said service upon receiving a service request.

14. The method of claim 1, wherein said platform that supports a plurality of services is configured to allow said plurality of services to be defined using different service-defining parameters applied to said service.

15. The method of claim 1, wherein said platform that supports a plurality of services is configured to support micro-segmentation of services using respective service bundle definitions for different market segments.

16. The method of claim 1, wherein said platform that supports a plurality of services comprises a rules engine.

17. The method of claim 1, wherein said platform that supports a plurality of services comprises is formed as a cluster of components configured to divide a platform capacity load there between.

18. The method of claim 1, wherein said platform that supports a plurality of services comprises at least one of an extendable management tool and an SNMP management system.

19. The method of claim 1, wherein said altering a logic of said service comprises altering at least one rule for determining at least one of whether said service is to be provided, and how said service is to be provided.

20. The method of claim 16, wherein said rules engine operates logic required for a desired service by implementing any of logical rules for service defining parameters, logical rules for service defining parameters implemented as logical rules, logical rules which form part of other logical rules, and logical rules which implement other logical rules.

21. The method of claim 1, wherein said altering a logic of said service comprises altering at least one rule for determining how said service is to be presented at said wireless communication device.

22. The method of claim 1, wherein said altering a logic of said service comprises altering said wireless communication device presentation according to any of a capacity level and device type of said wireless communication device.

23. The method of claim 1, wherein said altering a logic of said service comprises altering said wireless communication device presentation when a service is added, removed or altered.

\* \* \* \* \*